(12) United States Patent
Smith

(10) Patent No.: US 8,726,467 B1
(45) Date of Patent: May 20, 2014

(54) RETRACTABLE STRAP SYSTEM FOR ROLL UP DOORS

(76) Inventor: Kevin L. Smith, Leominster, MA (US)

( * ) Notice: Subject to any disclaimer, the term of this patent is extended or adjusted under 35 U.S.C. 154(b) by 0 days.

(21) Appl. No.: 13/560,554

(22) Filed: Jul. 27, 2012

(51) Int. Cl.
*A45C 3/00* (2006.01)

(52) U.S. Cl.
USPC .......................................................... 16/412

(58) Field of Classification Search
USPC ................ 16/412, 78; 160/24, 300–302; 296/186.4, 155; 119/771, 795–798; 242/385, 385.3, 385.4
See application file for complete search history.

(56) References Cited

U.S. PATENT DOCUMENTS

| | | | |
|---|---|---|---|
| 1,431,852 A | | 10/1922 | Treiber et al. |
| 2,773,547 A | * | 12/1956 | Conrad .......................... 160/301 |
| 3,198,300 A | | 8/1965 | Tuttle |
| 3,234,583 A | | 2/1966 | Kempel |
| 3,982,613 A | * | 9/1976 | Wood ............................ 190/116 |
| 4,064,574 A | * | 12/1977 | Schnitzler .......................... 5/627 |
| 4,511,123 A | * | 4/1985 | Ostrobrod ...................... 254/364 |
| 4,782,674 A | * | 11/1988 | Johnson .............................. 70/95 |
| 4,842,458 A | * | 6/1989 | Carpenter .......................... 410/3 |
| 4,854,522 A | * | 8/1989 | Brown et al. ............... 242/385.2 |
| 4,862,554 A | | 9/1989 | Chojnacki |
| 5,046,544 A | * | 9/1991 | Coluccio ........................ 160/201 |
| D573,493 S | | 7/2008 | Tsai |
| 7,618,356 B1 | * | 11/2009 | Johnson et al. ............... 482/124 |
| 7,690,858 B1 | * | 4/2010 | Chiavola ............................ 404/6 |
| 7,806,483 B2 | | 10/2010 | Schultz |
| 2004/0154556 A1 | * | 8/2004 | Masterson et al. ............ 119/794 |
| 2005/0045676 A1 | * | 3/2005 | Bass et al. ...................... 224/162 |
| 2009/0013497 A1 | | 1/2009 | Squyres et al. |

FOREIGN PATENT DOCUMENTS

JP  04272069 A * 9/1992 ............. B65H 75/48

* cited by examiner

*Primary Examiner* — Victor Batson
*Assistant Examiner* — Matthew Sullivan

(57) ABSTRACT

A retractable strap system for a roll up door of a truck featuring a housing with a spindle and a spring-loaded reel and a strap wrapped around the spindle. The spring-loaded reel is biased to retract the strap into the housing. A catch lever allows and prevents the spring-loaded reel from retracting of the strap into the housing. When the truck door is open, the strap can be pulled to a desired length and held at that desired length. The strap automatically retracts into a housing when the roll up door of the truck is closed, preventing its exposure or unnecessary wear.

5 Claims, 3 Drawing Sheets

RETRACTABLE STRAP SYSTEM FOR ROLL UP DOORS

BACKGROUND OF THE INVENTION

Straps attached to roll up doors (e.g., rear roll up doors of trucks and utility vehicles) can become torn or wear out, necessitating replacement. The present invention features a retractable strap system for roll up doors. The strap in the system retracts into a housing after each use, preventing its exposure or unnecessary wear. The system of the present invention may also help close the rear door more easily (as compared to a traditional strap).

Any feature or combination of features described herein are included within the scope of the present invention provided that the features included in any such combination are not mutually inconsistent as will be apparent from the context this specification, and the knowledge of one of ordinary skill in the art. Additional advantages and aspects of the present invention are apparent in the following detailed description and claims.

DESCRIPTION OF PREFERRED EMBODIMENTS

Figure 1:
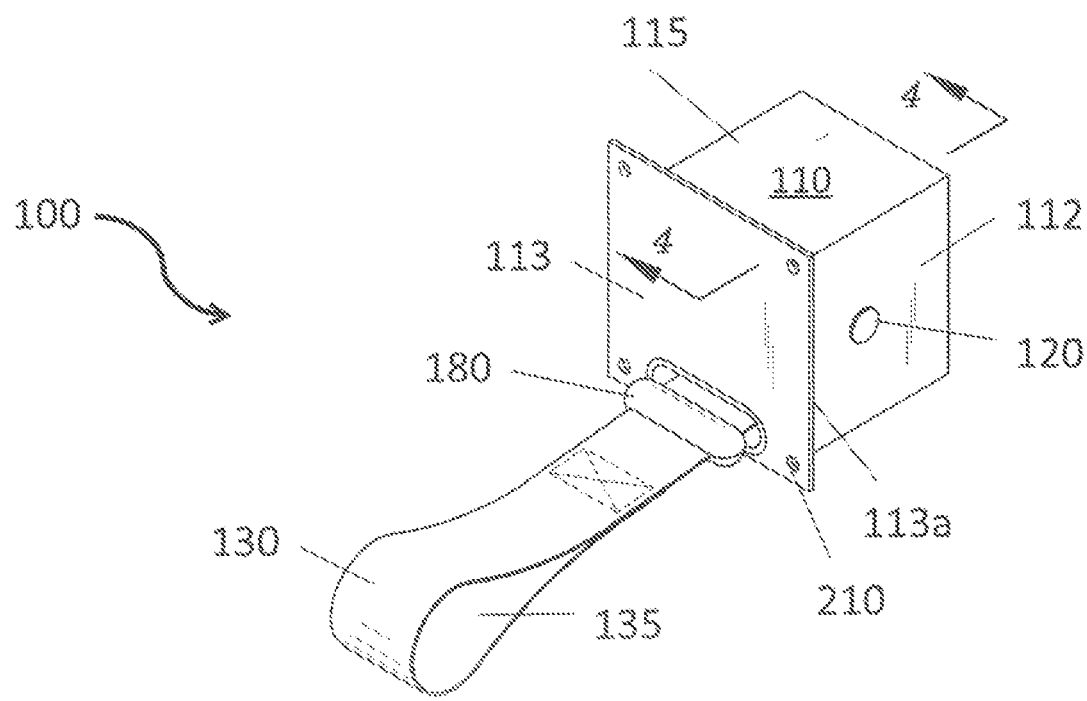
FIG. 1 is a front perspective view of the system of the present invention.
Figure 2:
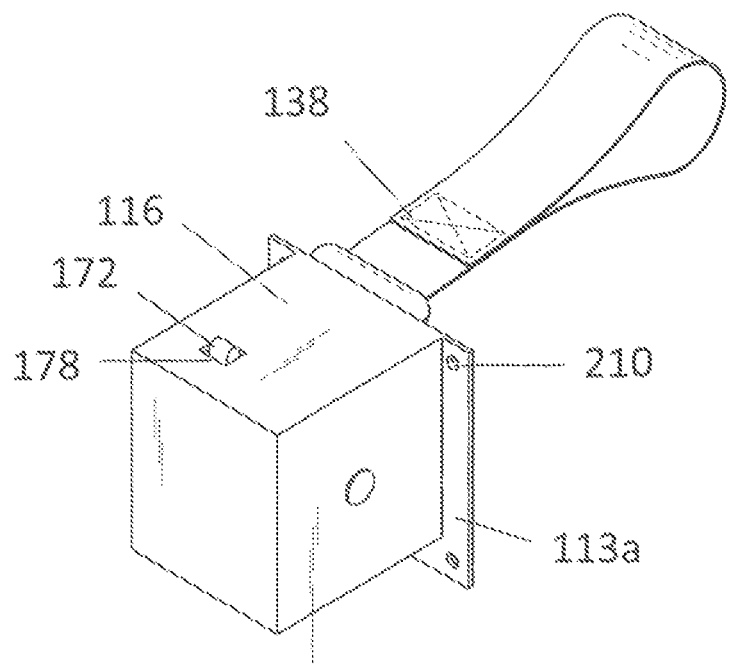
FIG. 2 is a back perspective view of the system of the present invention.
Figure 3:
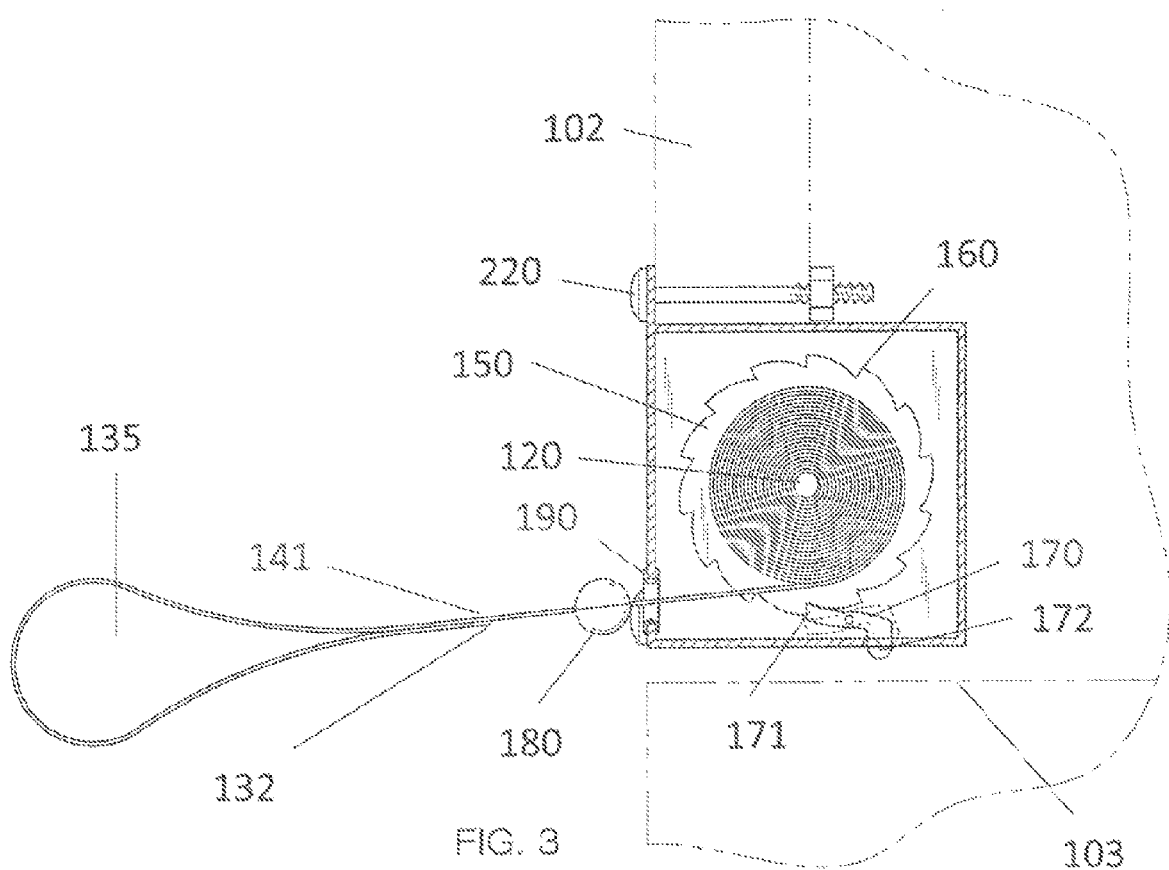
FIG. 3 is a cross-sectional view of the system of the present invention.

Referring now to FIG. 1-4, the present invention features a retractable strap system (100) for a roll up door (102) of a truck (101). The strap (130) in the system (100) retracts into a housing (100) after each use, preventing its exposure or unnecessary wear.

The retractable strap system (100) of the present invention comprises a housing (110) having a first side (111), a second side (112) opposite the first side (111), a front surface (113), a top surface (115), and an inner cavity (118). A slot (119) is disposed in the front surface (113) of the housing (110), wherein the slot (119) provides access to the inner cavity (118). The front surface (113) has flanges (113a) that extend past portions of the housing (110). For example, in some embodiments, the flanges (113a) extend past at least the top surface (115) and sides (111, 112) of the housing (110).

A spindle (120) is disposed in the inner cavity (118) of the housing (110). Spindles are well known to one of ordinary skill in the art. The spindle (120) has a first end rotatably engaged in the first side (111) of the housing (110) and a second end rotatably engaged in the second side (112) of the housing (110). The spindle (120) can rotate in a first direction and a second direction about its axis.

The system (100) further comprises a strap (130) having a first end and a second end (132). The first end is fixedly attached, to the spindle (120) (not shown). The strap (130) is wrapped around the spindle (120) and the second end (132) extends through the slot (119) in the front surface (113) of the housing (110).

The second end (132) of the strap (130) is fixedly attached (e.g., via an attachment means, e.g., via stitching 138) to a first point (141) on the strap (130), the first point (141) being a point on the strap (130) that is external to the housing (110) and spaced a distance from the second end (132) of the strap (130). The attachment of the second end (132) of the strap to the first point (141) on the strap (130) forms a loop (135). A user can use the loop (135) to grip onto the strap (130), for example for pulling down on the door (102) of the truck (101).

A spring-loaded reel (150) is disposed on the spindle (120) at the spindle's first end. Spring-loaded reels are well known to one of ordinary skill in the art. Teeth (160) are disposed around at least a portion of the outer surface of, the spring-loaded reel (150). The spring-loaded reel (150) is biased to retract the strap (130) into the housing (110).

The system (100) further comprises a catch lever (170) that functions to temporarily keep the strap (130) pulled a distance (as desired by the user) out of the housing (110). The catch lever (170) can engage the spring-loaded reel (150) to temporarily prevent the spring-loaded reel (150) from retracting the strap (130) into the housing (110) as the spring-loaded reel (150) is biased to do.

The catch lever (170) is disposed in the inner cavity (118) of the housing (110) at the first end (111) of the housing (110). The catch lever (170) is L-shaped and has a first end (171) and a second end (172), the second end (172) being perpendicular to the catch lever (170). The catch lever (170) is pivotally attached to the first end (111) of the housing (110) near the bottom surface (116) of the housing (110), and the catch lever (170) is positioned such that its first end (171) can engage the teeth (160) of the spring-loaded reel (150) when the first end (171) is pivoted towards the spring-loaded reel (150). The second end (172) of the catch lever (170) can pass through a hole (178) in the bottom surface (116) of the housing (110) when the second end (172) is pivoted toward the bottom surface (116) of the housing (110) (which occurs simultaneously when the first end (171) is pivoted toward the spring-loaded reel (150) with teeth (160)).

The catch lever (170) can pivot between at least a catch position wherein the first end (171) engages the teeth (160) of the spring-loaded reel (150) and the second end (172) of the catch lever (172) passes through the hole (178) in the bottom surface (116) of the housing (110), and a released position wherein the first end (171) is disengaged from the teeth (160) of the spring-loaded reel (150) and the second end (172) of the catch lever (172) is inside the inner cavity (118) of the housing (110) and free from the hole (178). In the catch position, the catch lever (170) prevents the spring-loaded reel (150) from retracting the strap (130) back into the housing (110). The catch lever (170) is biased in the catch position.

The teeth (160) of the spring-loaded reel (150) are configured to allow the strap (130) to be pulled from the housing (110) to a desired length with the catch lever (170) biased in the catch position. For example, when the strap (130) is pulled out, the catch lever (170) may slidably contact the teeth (160) and allow rotation of the spring-loaded reel (150). However, when the strap (130) is ceased to be pulled, the catch lever (170) engages the teeth (160) and prevents the spring-loaded reel (150) from rotating in its biased direction to retract the strap (130) into the housing (110). To retract the strap (130) into the housing (110), the catch lever (170) is moved to the released position. For example, in some embodiments, a user may press the second end (172) of the catch lever (170) into the hole (178) of the housing (110). Or, in some embodiments, the door (102) of the truck (101) is closed and thus the second end (172) of the catch lever (170) makes catch with the bed (103) of the truck (101), thereby moving the second end (172) of the catch lever (170) into the hole (178) of the housing (110) and moving the catch lever (170) to the released position.

When the catch lever (170) is moved to the released position, the first end (171) of the catch lever (170) disengages the teeth (160) and the spring-loaded reel (150) retracts the strap (130) back into the housing (110).

When the roll up door (102) of the truck (101) is open, the strap (130) can at least be pulled out of the housing (110) to a desired length and left at a desired length after being pulled out of the housing. When the roll up door (102) of the truck is closed and the second end (172) of the catch lever (170) contacts the bed (103) of the truck (101), the strap (130) is retracted into the housing (110).

In some embodiments, the retractable strap system (100) comprises the roll up door (102) of a truck (101) and/or the bed (103) of the truck (101).

Figure 4:
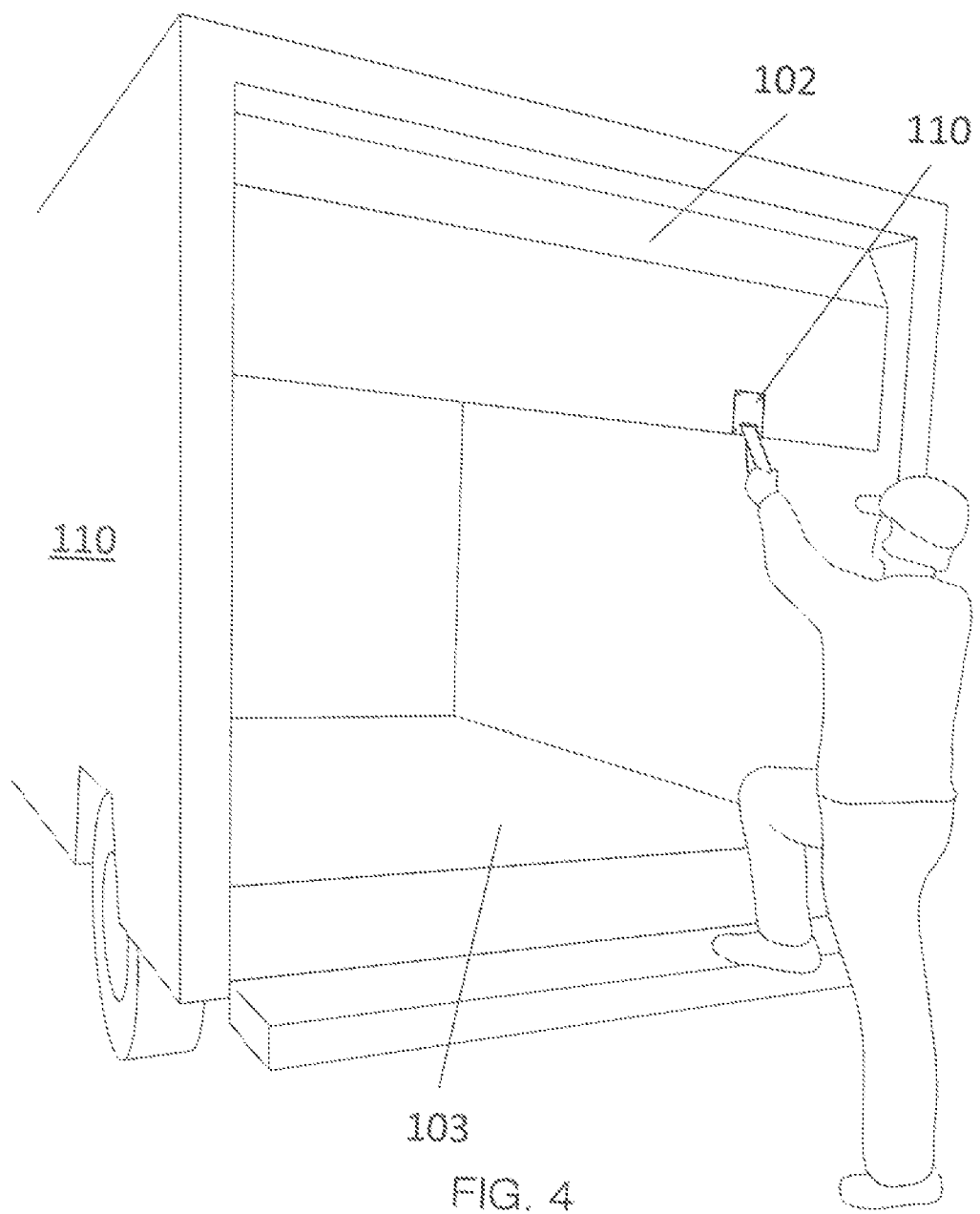
FIG. 4 is an in-use view of the system of the present invention.

As shown in FIG. 4, in some embodiments, the housing (110) is mounted to the door (102) of the truck (101), e.g., at the bottom end of the door (102). In some embodiments, the bottom surface (116) of the housing (110) is aligned with the bottom edge of the door (102). For example, in some embodiments, a portion of the door (102) is cut out to install the housing (110). In some embodiments, at least two mounting holes (210) are disposed in the flanges (113a) of the front surface (113) of the housing (110), wherein the mounting holes (210) are used to secure the housing (110) to the door (102). In some embodiments, bolts (220) extend through the mounting holes (210) and further through the roll up door (102) of the truck (101), wherein the bolts (220) secure the housing (110) to the roll up door (102).

In some embodiments, a stopper (180) is disposed on the strap (130) in between the first point (131a) on the strap (130) and the slot (119). The stopper (180) is larger than the slot (119) so as to prevent the stopper (180) and loop of the strap (130) from entering into the inner cavity (118) of the housing (110). In some embodiments; the stopper (180) is constructed from a material comprising rubber. In some embodiments, a grommet (190) is disposed on outer edges of the slot (119). In some embodiments, the grommet (190) is constructed from a material comprising rubber.

As used herein, the term "about" refers to plus or minus 10% of the referenced number.

The disclosures of the following U.S. Patents are incorporated in their entirety by reference herein: U.S. Pat. Application No. 2009/0013497; U.S. Pat. No. 3,198,300; U.S. Pat. No. 4,862,554; U.S. Pat. No. 1,431,852; U.S. Pat. No. 3,234,583; U.S. Design Pat. No. D573,493; U.S. Pat. No. 7,690,858; U.S. Pat. No. 7,806,483.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A retractable strap system (100) for a roll up door (102) of a truck (101), said system (100) comprising:

(a) a roll up door (102) of a truck (101) and a bed (103) of said truck (101);

(b) a housing (110) having a first side (111), a second side (112) opposite the first side (111), a front surface (113), a top surface (115), and an inner cavity (118), a slot (119) is disposed in the front surface (113) of the housing (110), the slot (119) provides access to the inner cavity (118), the front surface (113) has flanges (113a) that extend past at least the top surface (115) and sides (111, 112) of the housing (110);

(c) at least two mounting holes (210) disposed in the flanges (113a) of the front surface (113) of the housing (110), and bolts (220) extending through the mounting holes (210) and further through the roll up door (102) of the truck (101), the bolts (220) secure the housing (110) to the roll up door (102), a bottom surface (116) of the housing (110) is aligned with a bottom edge of the roll up door (102);

(d) a spindle (120) disposed in the inner cavity (118) of the housing (110), the spindle (120) has a first end rotatably engaged in the first side (111) of the housing (110) and a second end rotatably engaged in the second side (112) of the housing (110), the spindle (120) can rotate in a first direction and a second direction about its axis;

(e) a strap (130) having a first end and a second end (132), the first end is fixedly attached to the spindle (120), the strap (130) is wrapped around the spindle (120) and the second end (132) extends through the slot (119) in the front surface (113) of the housing (110) and is fixedly attached to a first point (141) on the strap (130) external to the housing (110) and spaced a distance from the second end (132) of the strap (130), the second end (132) of the strap and the first point (141) form a loop (135);

(f) a spring-loaded reel (150) disposed on the spindle (120) at its first end, wherein teeth (160) are disposed around at least a portion of an outer surface of the spring-loaded reel (150), the spring-loaded reel (150) is biased to retract the strap (130) into the housing (110);

(g) a catch lever (170) disposed in the inner cavity (118) of the housing (110) at the first end (111) of the housing (110), the catch lever (170) is L-shaped and has a first end (171) and a second end (172), the second end (172) being perpendicular to the catch lever (170), the catch lever (170) is pivotally attached to the first end (111) of the housing (110) near a bottom surface (116) of the housing (110), the catch lever (170) is positioned such that its first end (171) can engage the teeth (160) of the spring-loaded reel (150) when the first end (171) is pivoted towards the spring-loaded reel (150) and the second end (172) can pass through a hole (178) in the bottom surface (116) of the housing (110) when the second end (172) is pivoted toward the bottom surface (116) of the housing (110), the catch lever (170) can pivot between at least a catch position wherein the first end (171) engages the teeth (160) of the spring-loaded reel (150) and the second end (172) of the catch lever (172) passes through the hole (178) in the bottom surface (116) of the housing (110), and a released position wherein the first end (171) is disengaged from the teeth (160) of the spring-loaded reel (150) and the second end (172) of the catch lever (172) is inside the inner cavity (118) of the housing (110) and free from the hole (178), in the catch position the catch lever (170) prevents the spring-loaded reel (150) from retracting the strap (130) into the housing (110), wherein the catch lever (170) is biased in the catch position, the teeth (160) of the spring-loaded reel (150) are configured to allow the strap (130) to be pulled from the housing (110) to a desired length with the catch lever (170) biased in the catch position, when the strap (130) is ceased to be pulled the catch lever (170) engages the teeth (160) and prevents the spring-loaded reel (150) from retracting the strap (130) into the housing (110), to retract the strap (130) into the housing (110) the catch lever (170) is moved to the released position by either pressing the second end (172) of the catch lever (170) into the hole (178) in the housing (110) or closing the roll up door (102) of the truck (101) such that the second end (172) of the catch lever (170) makes contact with the bed (103) of the truck (101) and the bed (103) of the truck (101) presses the second end (172) of the catch lever (170) into the hole (178) of the housing (110), in the released position the first end (171) of the catch lever (170) disengages the teeth (160) and the spring-loaded reel (150) retracts the strap (130) back into the housing (110), when the roll up door (102) of the truck (101) is open the strap (130) can at least be pulled out of the housing (110) to a desired length and left at a desired length after being pulled out of the housing, when the roll up door (102) of the truck is closed and the second end (172) of the catch lever (170) contacts the bed (103) of the truck (101) the strap (130) is retracted into the housing (110), wherein the second end (172) of the catch lever (170) faces the bed (103) such that the catch lever (170) is moved to the released position by the bed (103) upon contact with the bed (103); and (h) a stopper (180) disposed on the strap (130) in between the first point (131a) on the strap (130) and the slot (119), the stopper (180) is larger than the slot (119) so as to prevent the stopper (180) and loop of the strap (130) from entering into the inner cavity (118) of the housing (110).

2. The system (100) of claim 1, wherein the stopper (180) is constructed from a material comprising rubber.

3. The system (100) of claim 1 further comprising a grommet (190) disposed on outer edges of the slot (119).

4. The system (100) of claim 3, wherein the grommet (190) is constructed from a material comprising rubber.

5. A retractable strap system (100) for a roll up door (102) of a truck (101), said system (100) consisting of:
(a) a roll up door (102) of a truck (101) and a bed (103) of said truck (101);
(b) a housing (110) consisting of a first side (111), a second side (112) opposite the first side (111), a front surface (113), a top surface (115), and an inner cavity (118), a slot (119) is disposed in the front surface (113) of the housing (110), the slot (119) provides access to the inner cavity (118), the front surface (113) consists of flanges (113a) that extend past at least the top surface (115) and sides (111, 112) of the housing (110);
(c) at least two mounting holes (210) disposed in the flanges (113a) of the front surface (113) of the housing (110), and bolts (220) extending through the mounting holes (210) and further through the roll up door (102) of the truck (101), the bolts (220) secure the housing (110) to the roll up door (102), a bottom surface (116) of the housing (110) is aligned with a bottom edge of the roll up door (102);
(d) a spindle (120) disposed in the inner cavity (118) of the housing (110), the spindle (120) consists of a first end rotatably engaged in the first side (111) of the housing (110) and a second end rotatably engaged in the second side (112) of the housing (110), the spindle (120) can rotate in a first direction and a second direction about its axis;
(e) a strap (130) consisting of a first end and a second end (132), the first end is fixedly attached to the spindle (120), the strap (130) is wrapped around the spindle (120) and the second end (132) extends through the slot (119) in the front surface (113) of the housing (110) and is fixedly attached to a first point (141) on the strap (130) external to the housing (110) and spaced a distance from the second end (132) of the strap (130), the second end (132) of the strap and the first point (141) form a loop (135);
(f) a spring-loaded reel (150) disposed on the spindle (120) at its first end, wherein teeth (160) are disposed around at least a portion of an outer surface of the spring-loaded reel (150), the spring-loaded reel (150) is biased to retract the strap (130) into the housing (110);
(g) a catch lever (170) disposed in the inner cavity (118) of the housing (110) at the first end (111) of the housing (110), the catch lever (170) is L-shaped and consists of a first end (171) and a second end (172), the second end (172) being perpendicular to the catch lever (170), the catch lever (170) is pivotally attached to the first end (111) of the housing (110) near a bottom surface (116) of the housing (110), the catch lever (170) is positioned such that its first end (171) can engage the teeth (160) of the spring-loaded reel (150) when the first end (171) is pivoted towards the spring-loaded reel (150) and the second end (172) can pass through a hole (178) in the bottom surface (116) of the housing (110) when the second end (172) is pivoted toward the bottom surface (116) of the housing (110), the catch lever (170) can pivot between at least a catch position wherein the first end (171) engages the teeth (160) of the spring-loaded reel (150) and the second end (172) of the catch lever (172) passes through the hole (178) in the bottom surface (116) of the housing (110), and a released position wherein the first end (171) is disengaged from the teeth (160) of the spring-loaded reel (150) and the second end (172) of the catch lever (172) is inside the inner cavity (118) of the housing (110) and free from the hole (178), in the catch position the catch lever (170) prevents the spring-loaded reel (150) from retracting the strap (130) into the housing (110), wherein the catch lever (170) is biased in the catch position, the teeth (160) of the spring-loaded reel (150) are configured to allow the strap (130) to be pulled from the housing (110) to a desired length with the catch lever (170) biased in the catch position, when the strap (130) is ceased to be pulled the catch lever (170) engages the teeth (160) and prevents the spring-loaded reel (150) from retracting the strap (130) into the housing (110), to retract the strap (130) into the housing (110) the catch lever (170) is moved to the released position by either pressing the second end (172) of the catch lever (170) into the hole (178) in the housing (110) or closing the roll up door (102) of the truck (101) such that the second end (172) of the catch lever (170) makes contact with the bed (103) of the truck (101) and the bed (103) of the truck (101) presses the second end (172) of the catch lever (170) into the hole (178) of the housing (110), in the released position the first end (171) of the catch lever (170) disengages the teeth (160) and the spring-loaded reel (150) retracts the strap (130) back into the housing (110), when the roll up door (102) of the truck (101) is open the strap (130) can at least be pulled out of the housing (110) to a desired length and left at a desired length after being pulled out of the housing, when the roll up door (102) of the truck is closed and the second end (172) of the catch lever (170) contacts the bed (103) of the truck (101) the strap (130) is retracted into the housing (110), wherein the second end (172) of the catch lever (170) faces the bed (103) such that the catch lever (170) is moved to the released position by the bed (103) upon contact with the bed (103); and (h) a stopper (180) disposed on the strap (130) in between the first point (131*a*) on the strap (130) and the slot (119), the stopper (180) is larger than the slot (119) so as to prevent the stopper (180) and loop of the strap (130) from entering into the inner cavity (118) of the housing (110).

\* \* \* \* \*